United States Patent
Degol et al.

(10) Patent No.: US 11,600,015 B2
(45) Date of Patent: Mar. 7, 2023

(54) FIDUCIAL WEB FOR COMPUTER VISION

(71) Applicant: Microsoft Technology Licensing, LLC, Redmond, WA (US)

(72) Inventors: Joseph Michael Degol, Seattle, WA (US); Brent Armen Ellwein, Sammamish, WA (US); Yashar Bahman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 17/162,881

(22) Filed: Jan. 29, 2021

(65) Prior Publication Data
US 2022/0245852 A1 Aug. 4, 2022

(51) Int. Cl.
*G06T 7/73* (2017.01)
*G06T 7/246* (2017.01)

(52) U.S. Cl.
CPC .............. *G06T 7/73* (2017.01); *G06T 7/246* (2017.01); *G06T 2207/30204* (2013.01); *G06T 2207/30244* (2013.01)

(58) Field of Classification Search
CPC ... G06T 7/11; G06T 7/12; G06T 7/246; G06T 7/248; G06T 7/70; G06T 7/73; G06T 7/74; G06T 2207/30204; G06T 2207/30244; G06V 10/22; G06V 10/255; G06V 10/1023; G06V 10/457
See application file for complete search history.

(56) References Cited

U.S. PATENT DOCUMENTS

| | | | |
|---|---|---|---|
| 10,909,715 B1* | 2/2021 | Boggs et al. | G06T 7/20 |
| 2020/0364482 A1* | 11/2020 | Bradski et al. | G06V 10/462 |
| 2021/0350566 A1* | 11/2021 | Hu et al. | G06T 19/006 |

OTHER PUBLICATIONS

"International Search Report and Written opinion Issued in PCT Application No. PCT/US22/012394", dated Apr. 21, 2022, 12 Pages.
Getschmann, et al., "Seedmarkers: Embeddable Markers for Physical Objects", In Proceedings of the Fifteenth International Conference on Tangible, Embedded, and Embodied Interaction, Feb. 14, 2021, 11 Pages.
Watanabe, et al., "Extended Dot Cluster Marker for High-Speed 3D Tracking in Dynamic Projection Mapping", In Proceedings of IEEE International Symposium on Mixed and Augmented Reality, Oct. 2017, pp. 52-61.
Yu, et al., "TopoTag: A Robust and Scalable Topological Fiducial Marker System", In Journal of IEEE Transactions on Visualization and Computer Graphics, vol. 27, Issue 9, Apr. 20, 2020, pp. 3769-3780.
"Seedmarkers", Retrieved from: https://github.com/volzotan/Seedmarkers/commits/master, May 10, 2021, 2 Pages.

* cited by examiner

*Primary Examiner* — Andrew W Johns
(74) *Attorney, Agent, or Firm* — Schwegman Lundberg & Woessner, P.A.

(57) ABSTRACT

A computer implemented method includes capturing images of an environment via a camera, detecting image features in the environment based on the captured images, the image features including at least one web feature derived from a fiducial web formed of a collection of non-repeating intersecting lines applied to an object in the environment, and estimating a camera pose based on the detected image features including the at least one web feature.

20 Claims, 5 Drawing Sheets

FIDUCIAL WEB FOR COMPUTER VISION

BACKGROUND

Camera images can be used in computer vision applications to help determine a position or pose of a camera within an environment. However, there may be times where the application is unable to determine the position of the camera from such images. Fiducial markers may be applied to objects within the environment that are recognizable from images to help the application determine the position of the camera.

Many different types of fiducial markers have been used. Some markers are paired with a detection algorithm that specifically is designed for them. Some markers have a limited number of permutations, such as for example 500 different markers. Still other markers are typically designed to only fit on a letter size piece of paper. Some markers are designed to have a "bar-code"-like tag in the middle, which produces many false matches with feature descriptors.

SUMMARY

A computer implemented method includes capturing images of an environment via a camera, detecting image features in the environment based on the captured images, the image features including at least one web feature derived from a fiducial web formed of a collection of non-repeating intersecting lines applied to an object in the environment, and estimating a camera pose based on the detected image features including the at least one web feature.

DETAILED DESCRIPTION

Figure 1:
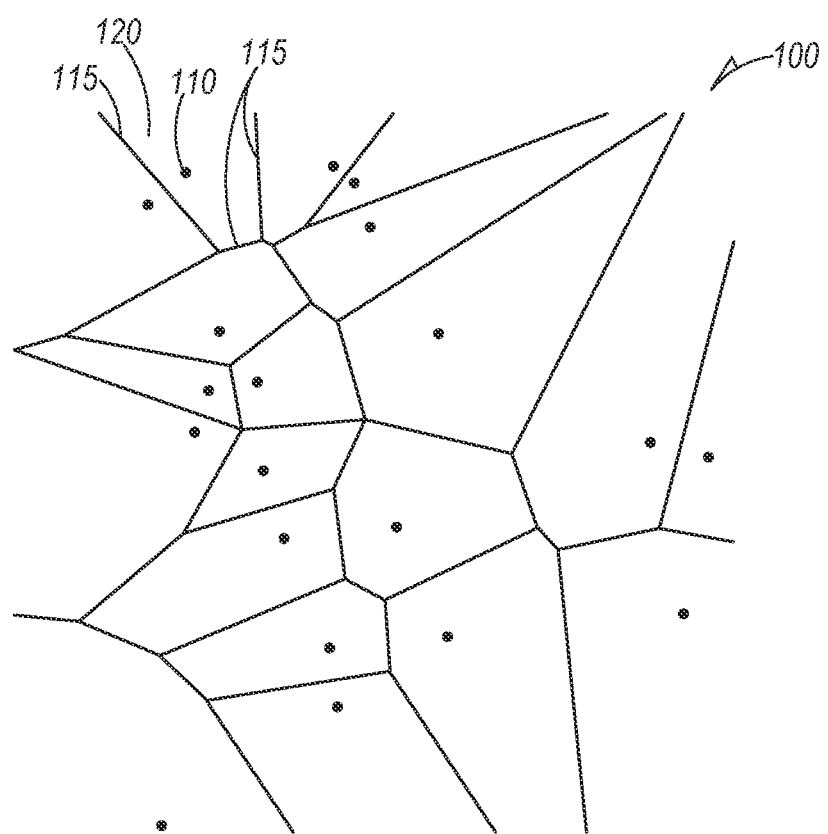
FIG. 1 is an example fiducial web according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A web is a marker design that improves tracking and relocalization for camera pose estimation in computer vision-based applications. Webs, also referred to as fiducial webs may be patterns of intersecting lines. The patterns may be non-repeating. In one embodiment, a fiducial web is a constrained random Voronoi-like pattern that has multiple cell boundary lines giving a web like appearance. There are parameters that can be tuned to control the size of each web cell, line width, etc. The term random as used herein may range from entirely random to intentional randomness. As described below, while certain parameters may be adjusted, there may still be enough randomness in the resulting webs to minimize the chances of two webs being identified as the same web in any particular application.

The webs can include lines printed on a substrate and placed on or printed on or projected on objects in an environment, such as walls, to enable a tracking algorithm, such as known feature point trackers, to identify a marker correlated with a position in the environment. The lines of the web may be printed on paper with desired contrast between the color of the lines and the paper or other substrate. The projection may be of just the lines of the web in a color sufficient to provide contrast with the color of the object the lines are projected on.

Pose and relocalization for a camera in an environment is normally performed based on recognized image features. In a field of view of the camera where there are otherwise no recognized features, a web can itself provide features on which pose and relocalization are based.

In the case of a wall, there may be little contrast on the wall, leaving a tracking algorithm without sufficient information in order to localize the camera or determine the camera pose. In other words, few if any image features may be derived from such a wall. The use of the web provides a high contrast unique pattern from which one or more image features, referred to as web features are recognizable by the tracking algorithm. The web thus provides image features for use by the tracking algorithm to determine pose and relocalization. The random arrangement of cells works nicely with existing feature detection/description algorithms such as Microsoft Hololens tracking algorithms as well as others such as feature point trackers, optical flow trackers, and patch-based trackers without alteration of such trackers.

The webs may be any arbitrary size and have been tested on walls at 12'×2' all the way down to phone tracking at 3"×1". The webs may be printed and adhered to a surface, or may even be projected onto a surface in the environment by means of light, such as laser light which may be visible or outside the visible range but detectable by a camera, such as infrared light. A high contrast between the object and the web makes it easier for feature identification and for the tracking algorithm to recognize and identify. In some embodiments, light may be reflected or absorbed by the web lines dependent on the background or web cell fill.

FIG. 1 is an example web 100. Web 100 may be formed by generating a Voronoi diagram in one embodiment. A plane is partitioned into regions close to each of a given set of seed points 110, only one of which is labeled with reference number 110. In the simplest case the seed points may be referred to as seeds, sites, or generators. For each seed there is a corresponding region consisting of all boundary points of the plane closer to that seed than to any other seed. Euclidean distance may be used as shown in FIG. 1, but other forms of distance, such as Manhattan distance may be used in further embodiments. Still other means for creating web-like patterns may be used in further embodiments.

The boundary points form lines 115 around the seeds 110 forming a cell 120 for each seed 110. The seeds 110, while shown in FIG. 1 need not be part of the resulting web 100 and are only shown to illustrate one method of forming web 100. Note that boundary cells, such as cell 120 need not have a line corresponding to the edge of the web. Seeds internal to the web result in cells bounded by lines on all sides.

The seeds 110 may be randomly generated in one embodiment such that the resulting webs are also random. In some embodiments, some constraints may be placed on generation of points for use in forming a web. Since the webs are digitally generated, a pixel array is first selected. Example pixel arrays for a web may vary greatly. Example pixel arrays are a 500×500 pixel pattern or a 1000×1000 pixel size. Larger or smaller arrays may be used in various embodiments. Note that pixel arrays may be in any shape desired, such as a rectangle or other polygon, or even an array having one or more curved edges.

Once the pixel array size is selected, a first constraint may include the number of seeds to identify within the pixel array. Web 100 contains 20 seeds. In further embodiments, many more or fewer seeds may be used. The density of seeds for a given array may depend on the environment in which the resulting webs are to be used and the distances from which it is desired for the web to be recognized. Too dense a pattern will reduce the overall contrast of the web from longer distances. Less dense patterns may reduce the ability to create a large number of unique webs.

A second constraint may include a comparison of a newly generated seed to seeds already generated. A seed distance constraint may be used to ensure that no new seed is within a selected number of pixels of a previously generated seed. This constraint may also be used to ensure that the cell size is large enough to provide sufficient contrast and hence ability of the tracking algorithm to identify the web. One example seed distance constraint may be expressed in pixels, such as 10 pixels, or converted to an actual distance. For example, a web for a wall that provides web features to be identified from 100 meters away, may have a much larger web cell size than for a wall expected to be identified from within 10 feet. The size can be controlled by one or both of the array size and seed distance constraints. In some embodiments, the actual size of the web may be 30 meters long or longer.

A line width constraint may also be used to define how wide each boundary line is drawn. For smaller webs, the line size needs to be narrower than larger webs intended for web feature identification from longer distances. A narrow line width for such a larger web may not provide sufficient contrast for web feature identification from a long distance.

In a further embodiment, a web size may be selected, and the corresponding pixel array may be divided into uniform or non-uniform grid cells. A seed may then be selected within each grid cell. The seed in each grid cell may have a randomly selected position within each grid cell. This will also result in a web having cells numbering the same as the number of grid cells.

In still further embodiments, any method may be used to generate webs including non-repeating patterns of intersecting lines.

Figure 2:
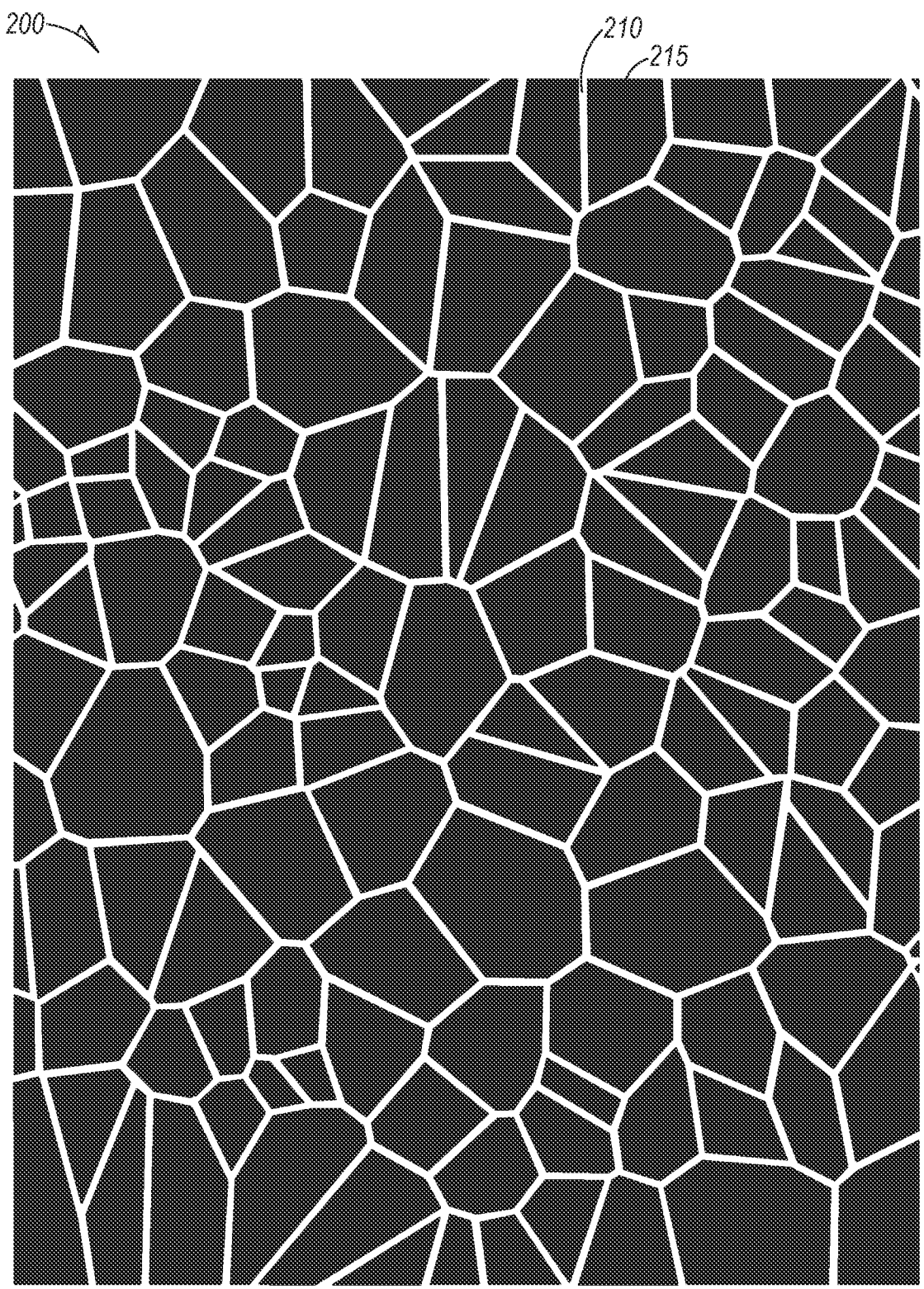
FIG. 2 is an illustration of a web that is based on about 100 seeds according to an example embodiment.

FIG. 2 is an illustration of a web 200 that is based on about 100 seeds. Note that web 200 utilizes lines 210 that are white to contrast from a black cell filling 215. Web 200 helps illustrate the point that the web lines should contrast from the web cell fill.

Figure 3:
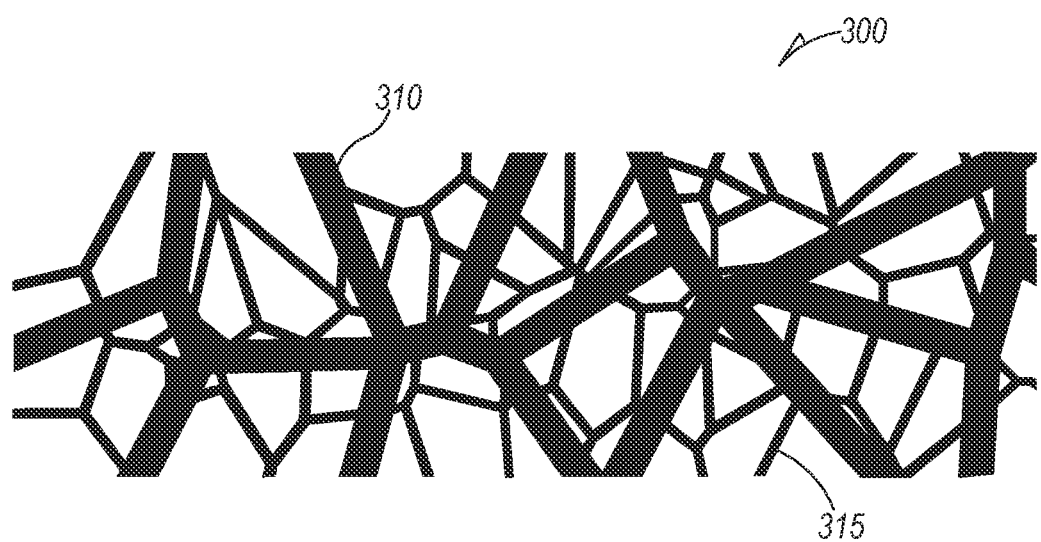
FIG. 3 is an illustration of an "inception" style web that includes one or more webs inside a web according to an example embodiment.

FIG. 3 is an illustration of an "inception" style web 300 that includes one or more webs inside a web. The inception style web 300 provides improved results over a single web because the inception style web provides web features that are trackable via computer vision over a larger range of distances. Web 300 includes two webs, a larger line web defined by larger lines 310 and a smaller line web defined by smaller lines 315. In some embodiments, the smaller line web may also be denser in terms of the number of cells per given area than the larger line web. In web 300, each web is formed on the same pixel array size and thus has the same overall physical footprint. Larger lines 310 may be tracked when a camera far away from web 300 and the smaller lines 315 may be tracked when the camera is closer to web 300.

In further embodiments, different sized webs of an inception web may partially overlap each other or even be spaced apart from each other. Note that each of the webs in an inception web may be varied using the above described constraints.

The number of levels (different sized webs) of an inception web may be increased to further increase the range of recognition. Two levels are shown in web 300 and may work within a range of a few inches from an object, such as a wall to more than 15' from the wall depending on the size of the printed or projected patterns. The web features identifiable from an inception web may be based on either line width web or a combination of line widths from various distances.

Figure 4:
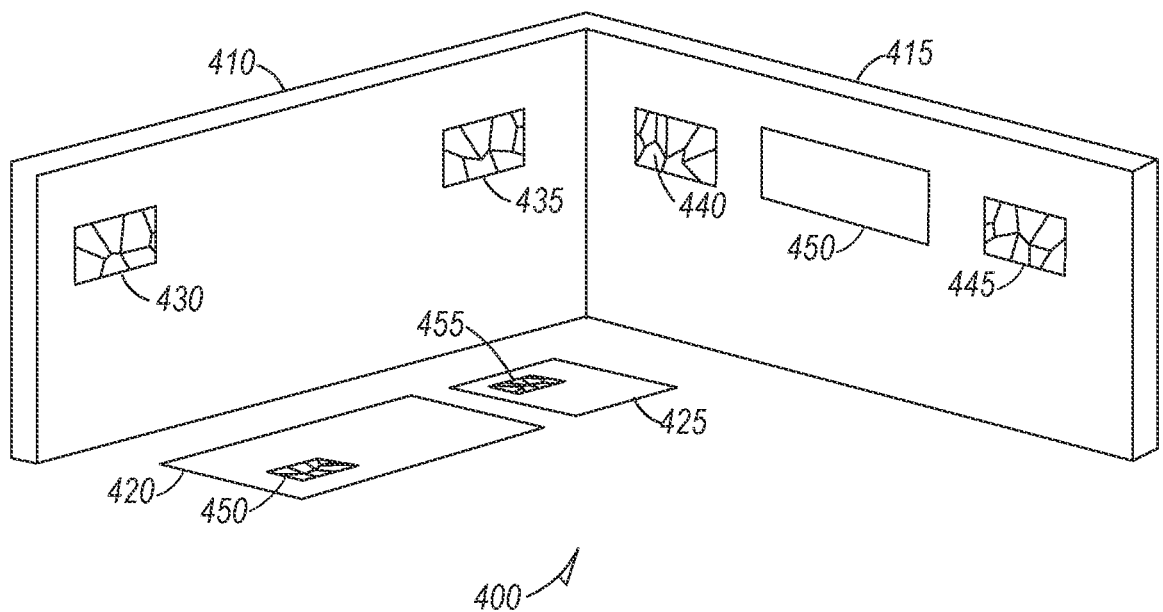
FIG. 4 is a block perspective diagram representation of a portion of an environment that include objects labeled with fiducial webs according to an example embodiment.

FIG. 4 is a block perspective diagram representation of a portion of an environment 400 to be scanned that includes multiple objects, such as walls 410, 415, a couch 420, and a chair 425. Environment 400 is a simple example of an environment. Other environments may be much more complex and include many more objects. Several webs are illustrated on various surfaces of the objects in environment 400. Webs 430 and 435 are positioned on wall 410 and are spaced apart. Webs 440 and 445 are positioned on wall 415 and are also spaced apart. Couch 420 has an associated web 450 and chair 425 has an associated web 455.

During initial scanning of environment 400 that includes one or more webs as described above, features may be generated from the objects and from the webs. Objects may also be recognized and each object on which a web has been placed or projected on may optionally be associated with the corresponding web. Since all webs are different, different sets of features may be generated for a web and the web can thus act as an identifier of the object. The position of the web on the object may be noted during the initial scan. The result of the scanning is a digitized version of the environment 400. Thus, during utilizing a digitized representation of the environment during a virtual or augmented reality experience, each time a web is encountered, the camera pose and position can easily be calculated as a function of the features associated with the web. One or more features of a web may also be tracked between images, just as features derived from objects may be tracked.

Wall 410 may be a flat wall without distinguishing features. Without the webs 430 and 435, a camera pointed toward the wall may contain no features from which the wall can be identified. The webs 430 and 435 may each have one or more detectable features so that if one or both of the webs are within the field of view of the camera, the position and pose of the camera with respect to a corresponding position within environment 400 may be determined.

Note that while two webs are shown on each wall, many more may be applied to ensure that narrow fields of view cameras can still determine position and pose when close to the wall.

Also shown in environment 400 is a painting 460 on wall 415, the painting 460 may itself include distinguishing features that allow camera pose and position to be determined. But, as seen in environment 400, not all objects contain such features. The use of webs can help augment the available features in an environment from which camera pose and position can be determined. In further embodiments, webs may be used to identify objects that have not already been scanned. For example, just like bar codes or QR codes can be used to encode data and can be placed on objects for sale or tracking for inventory or other purposes, the webs can be similarly used, however, providing a marker that is easier to identify using camera images of the web. In one example, each room of a hotel may have an associated web.

Figure 5:
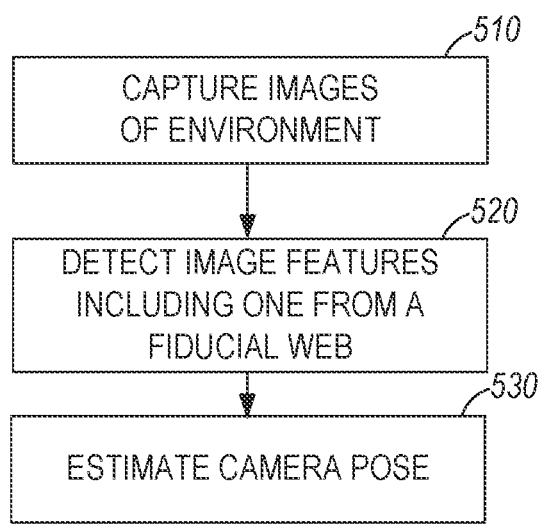
FIG. 5 is a flowchart illustrating a computer implemented method of using fiducial webs in an environment to determine camera position and pose within the environment according to an example embodiment.

FIG. 5 is a flowchart illustrating a computer implemented method 500 of using fiducial webs in an environment to determine camera position and pose within the environment. Method 500 begins at operation 510 by using a camera to capture a images of the environment. At operation 520, image features are detected in the environment based on the captured images. The image features include at least one web feature derived from a fiducial web formed of a collection of non-repeating intersecting lines applied to an object in the environment. A camera pose is estimated at operation 530 based at least in part on the web feature. Estimating a camera pose comprises relocalization of the camera within a coordinate system corresponding to the environment.

One example of a fiducial web comprises a Voronoi pattern. The fiducial web has a number of cells defined by lines which may be based on a selected number of seeds randomly placed within a selected pixel array. The line width may be selectable.

In some embodiments the fiducial web is formed of lines having at least two different line widths. A first web may have a first line width and a second web may have a second line width greater than the first line width. The first web may also have a denser number of cells as compared to the second web. Detecting the web at operation 530 may include tracking at least one web feature derived from the first web in response to the camera being within a first distance of the web and tracking at least one web feature derived from the second web in response to the camera being outside or beyond the first distance to the web.

The fiducial web can be applied to the object as a printed pattern or can even be applied as projected light, either as visible light, or even light outside the visual spectrum, yet still distinguishable by a camera. The printed pattern may also reflect visible light or light outside the visible spectrum.

Figure 6:
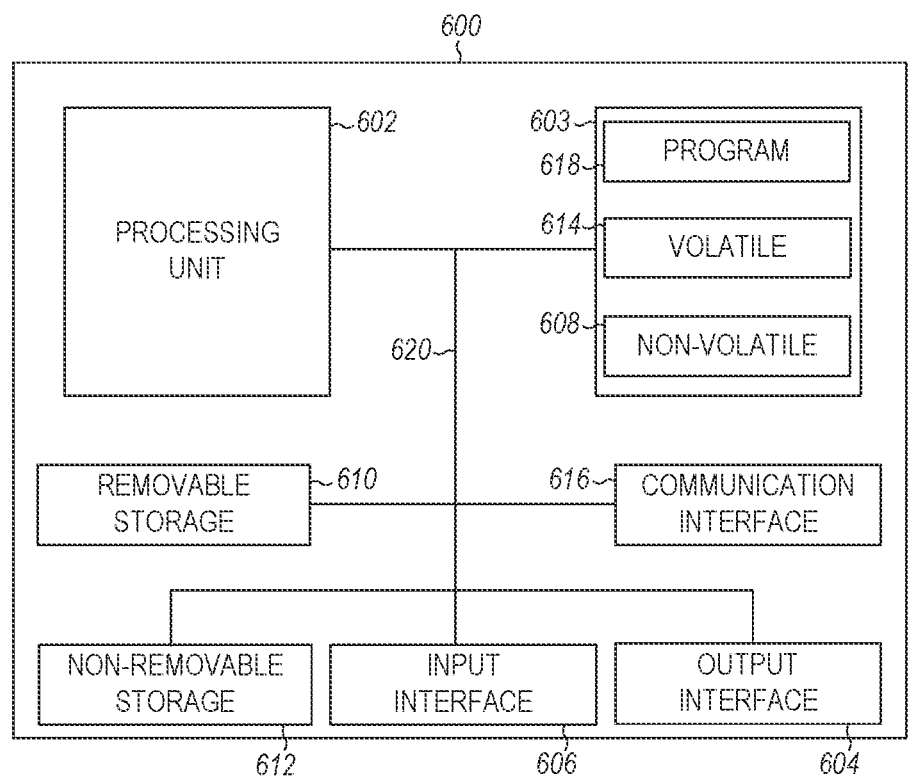
FIG. 6 is a block schematic diagram of a computer system to implement one or more example embodiments.

FIG. 6 is a block schematic diagram of a computer system 600 to create and utilize features derived from fiducial webs to estimate camera pose and position within an environment and for performing other methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves to the extent carrier waves are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes capturing images of an environment via a camera, detecting image features in the environment based on the captured images, the image features including at least one web feature derived from a fiducial web formed of a collection of non-repeating intersecting lines applied to an object in the environment, and estimating a camera pose based on the detected image features including the at least one web feature.

2. The method of example 1 and further comprising tracking the image features between the captured images.

3. The method of any of examples 1-2 wherein the fiducial web comprises a Voronoi pattern.

4. The method of any of examples 1-3 wherein the fiducial web has a number of cells defined by lines based on a selected number of seeds randomly placed within a selected pixel array.

5. The method of example 4 wherein a width of the lines is selectable.

6. The method of any of examples 1-5 wherein the fiducial web is applied to the object as a printed pattern or as projected light.

7. The method of any of examples 1-6 wherein the fiducial web comprises lines having at least two different line widths.

8. The method of any of examples 1-7 wherein the fiducial web comprises a first web having a intersecting lines of first line width and a second web having intersecting lines of a second line width greater than the first line width.

9. The method of example 8 wherein the first web intersecting lines define cells having a first size and the second web intersecting lines define cells have a second size larger than the first size.

10. The method of example 9 wherein detecting the web includes tracking a web feature derived from the first web in response to the camera being within a first distance of the web and tracking a web feature derived from the second web in response to the camera being further than the first distance to the web.

11. The method of any of examples 1-10 wherein estimating a camera pose comprises relocalization of the camera within a coordinate system corresponding to the environment.

12. A machine-readable storage device has instructions for execution by a processor of a machine to cause the processor to perform operations to perform a method. The operations include capturing images of an environment via a camera, detecting image features in the environment based on the captured images, the image features including at least one web feature derived from a fiducial web formed of a collection of non-repeating intersecting lines applied to an object in the environment, and estimating a camera pose based on the detected image features including the at least one web feature.

13. The device of example 12 wherein the operations further comprise tracking the image features between the captured images.

14. The device of any of examples 12-13 wherein the fiducial web comprises a Voronoi pattern.

15. The device of any of examples 12-14 wherein the fiducial web has a number of cells defined by lines based on a selected number of seeds randomly placed within a selected pixel array, wherein the line width is selectable.

16. The device of any of examples 12-15 wherein the fiducial web is applied to the object as a printed pattern or as projected light.

17. The device of any of examples 12-16 wherein the fiducial web comprises a first web having a intersecting lines of first line width and a second web having intersecting lines of a second line width greater than the first line width and wherein the first web intersecting lines define cells having a first size and the second web intersecting lines define cells have a second size larger than the first size.

18. The device of any of examples 12-17 wherein the fiducial web comprises a first web having a first line width and a second web having a second line width greater that the first line width and wherein detecting the web includes operations of tracking a feature derived from the first web in response to the camera being within a first distance of the web and tracking a feature derived from the second web in response to the camera being beyond the first distance to the web.

19. A device includes a processor and a memory device coupled to the processor and having a program stored thereon for execution by the processor to perform operations. The operations include capturing images of an environment via a camera, detecting image features in the environment based on the captured images, the image features including at least one web feature derived from a fiducial web formed of a collection of non-repeating intersecting lines applied to an object in the environment, and estimating a camera pose based on the detected image features including the at least one web feature.

20. The device of example 19 wherein the operations further comprise tracking the image features between the captured images and wherein the fiducial web comprises a first web having a first line width and a second web having a second line width greater that the first line width and wherein tracking the image features includes tracking a feature derived from the first web in response to the camera being within a first distance of the web and tracking a feature derived from the second web in response to the camera being beyond the first distance to the web.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
capturing images of an environment via a camera;
detecting image features in the environment based on the captured images, the image features including at least one web feature derived from a fiducial web formed of a collection of non-repeating intersecting lines applied to an object in the environment; and
estimating a camera pose based on the detected image features including the at least one web feature.

2. The method of claim 1 and further comprising tracking the image features between the captured images.

3. The method of claim 1 wherein the fiducial web comprises a Voronoi pattern.

4. The method of claim 1 wherein the fiducial web has a number of cells defined by lines based on a selected number of seeds randomly placed within a selected pixel array.

5. The method of claim 4 wherein a width of the lines is selectable.

6. The method of claim 1 wherein the fiducial web is applied to the object as a printed pattern or as projected light.

7. The method of claim 1 wherein the fiducial web comprises lines having at least two different line widths.

8. The method of claim 1 wherein the fiducial web comprises a first web having a intersecting lines of first line width and a second web having intersecting lines of a second line width greater than the first line width.

9. The method of claim 8 wherein the first web intersecting lines define cells having a first size and the second web intersecting lines define cells have a second size larger than the first size.

10. The method of claim 9 wherein detecting the web comprises:
tracking a web feature derived from the first web in response to the camera being within a first distance of the web; and
tracking a web feature derived from the second web in response to the camera being further than the first distance to the web.

11. The method of claim 1 wherein estimating a camera pose comprises relocalization of the camera within a coordinate system corresponding to the environment.

12. A machine-readable storage device having instructions for execution by a processor of a machine to cause the processor to perform operations to perform a method, the operations comprising:
capturing images of an environment via a camera;
detecting image features in the environment based on the captured images, the image features including at least one web feature derived from a fiducial web formed of a collection of non-repeating intersecting lines applied to an object in the environment; and
estimating a camera pose based on the detected image features including the at least one web feature.

13. The device of claim 12 wherein the operations further comprise tracking the image features between the captured images.

14. The device of claim 12 wherein the fiducial web comprises a Voronoi pattern.

15. The device of claim 12 wherein the fiducial web has a number of cells defined by lines based on a selected number of seeds randomly placed within a selected pixel array, wherein the line width is selectable.

16. The device of claim 12 wherein the fiducial web is applied to the object as a printed pattern or as projected light.

17. The device of claim 12 wherein the fiducial web comprises a first web having a intersecting lines of first line width and a second web having intersecting lines of a second line width greater than the first line width and wherein the first web intersecting lines define cells having a first size and the second web intersecting lines define cells have a second size larger than the first size.

18. The device of claim 12 wherein the fiducial web comprises a first web having a first line width and a second web having a second line width greater that the first line width and wherein detecting the web comprises:
tracking a feature derived from the first web in response to the camera being within a first distance of the web; and
tracking a feature derived from the second web in response to the camera being beyond the first distance to the web.

19. A device comprising:
a processor; and
a memory device coupled to the processor and having a program stored thereon for execution by the processor to perform operations comprising:
capturing images of an environment via a camera;
detecting image features in the environment based on the captured images, the image features including at least one web feature derived from a fiducial web formed of a collection of non-repeating intersecting lines applied to an object in the environment; and
estimating a camera pose based on the detected image features including the at least one web feature.

20. The device of claim 19, wherein the operations further comprise tracking the image features between the captured images and wherein the fiducial web comprises a first web having a first line width and a second web having a second line width greater that the first line width and wherein tracking the image features comprises:
tracking a feature derived from the first web in response to the camera being within a first distance of the web; and
tracking a feature derived from the second web in response to the camera being beyond the first distance to the web and wherein each of the first and second webs comprise collections of non-repeating intersecting lines.

\* \* \* \* \*